United States Patent [19]

Walters

[11] 4,331,346
[45] May 25, 1982

[54] TELESCOPING TRAILER FOR BOATS AND THE LIKE

[76] Inventor: Klemens C. Walters, 1825 Foxcroft La., Allison Park, Pa. 15101

[21] Appl. No.: 130,856

[22] Filed: Mar. 17, 1980

[51] Int. Cl.³ .............................................. B60P 3/10
[52] U.S. Cl. ................................ 280/414.1; 280/482; 414/477
[58] Field of Search ............... 280/414 R, 482; 9/1.2; 414/477, 478, 479; 114/90; 212/230, 267, 231, 187, 264; 254/298

[56] References Cited

U.S. PATENT DOCUMENTS

| | | | |
|---|---|---|---|
| 2,354,422 | 7/1944 | Roby | 254/298 X |
| 3,097,755 | 7/1963 | Fulcher | 280/414 R |
| 3,140,003 | 7/1964 | Horner | 414/477 |
| 3,738,684 | 6/1973 | Lusk | 9/1.2 |
| 3,989,266 | 11/1976 | Foster | 280/414 R |
| 4,050,595 | 9/1977 | Bussard | 280/414 R |

Primary Examiner—John A. Pekar
Attorney, Agent, or Firm—Webb, Burden, Robinson & Webb

[57] ABSTRACT

Means for telescoping the main frame of a boat trailer or the like having a tongue member which extends longitudinally of the main frame in a continuous section is disclosed. There is at least one sleeve member having a substantially rectangular cross section for slidably receiving the tongue member. Winch means, including a gear change mechanism, are used to move the main frame with respect to the tongue member and a boat or the like with respect to the frame.

7 Claims, 13 Drawing Figures

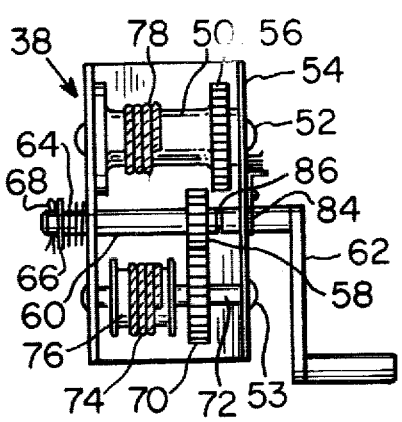
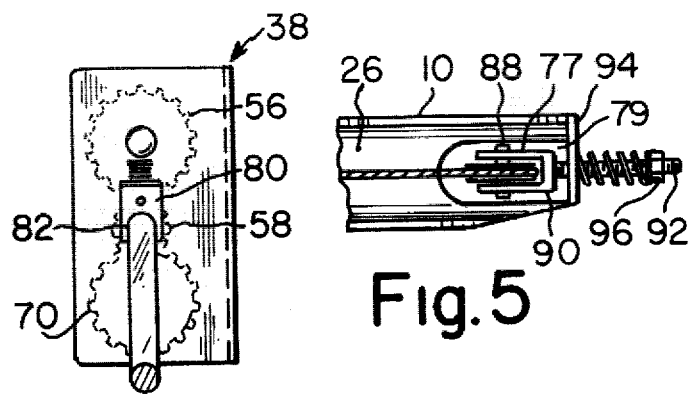
Fig.3    Fig.4    Fig.5
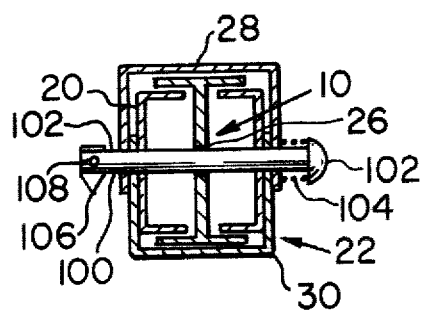
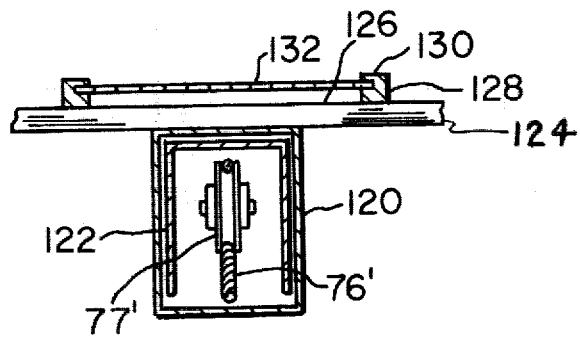
Fig.7    Fig.13
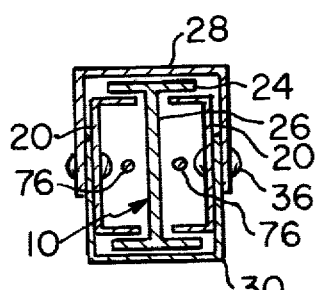
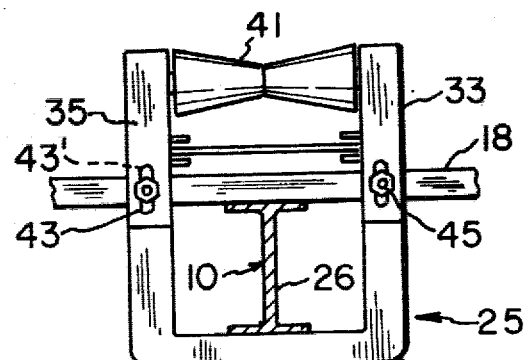
Fig.6    Fig.10
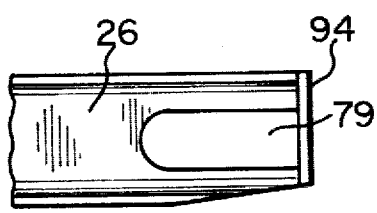
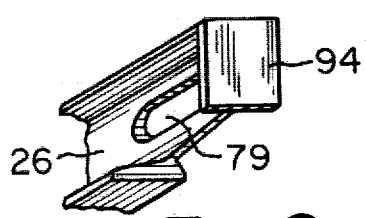
Fig.8    Fig.9

TELESCOPING TRAILER FOR BOATS AND THE LIKE

BACKGROUND OF THE INVENTION

1. Field of the Invention

This invention relates to trailers, especially those suitable for transporting boats and the like, of the type normally drafted or pulled by motor vehicles. Typical of such trailers are those having a frame supported on one or more axles for mounting the running wheels and having a longitudinal tongue including a hitch for attachment to a vehicle.

2. Description of the Prior Art

An increase in leisure time and development of waterway facilities have made boating more popular than ever. This increase in popularity has resulted in more boats and a greater demand for docking space, causing the availability of docking to decrease and the cost of docking to increase. Hence, greater numbers of boat owners than ever before are trailering their boats, even though the size of the boats is also on the increase. Trailering also allows a boat owner considerable flexibility in the choice of recreational water areas.

A necessary but difficult task associated with boat trailering is the loading and unloading of the boat onto or from the trailer. The trailer with boat is backed into the water to the extent necessary to permit the boat to be slipped off the trailer and into the water with a minimum of physical labor. The boat is reloaded on the trailer by again backing the trailer in the water and using a conventional winch mounted forward of the boat trailer with a cable attached to the bow of the boat so that the boat is pulled onto the trailer using the winch and cable.

As boats become larger and larger, it has become increasingly difficult to load and unload a boat onto and from a trailer in the foregoing manner. It is often necessary to back the trailer into the water to such an extent that the rear wheels of the vehicle pulling the trailer are completely submerged. Not only is traction a problem and getting stuck a real possibility, but the water can cause rusting of metal components and other damage.

Finally, while the boat owner is often willing to spend substantial amounts on his boat, he becomes quite frugal in connection with his trailer and the combination of reliability and low cost are a necessity.

To overcome some of the difficulties associated with the loading and unloading of boats onto and from boat trailers, various forms of telescoping or pivotable frame boat trailers have been developed. Such trailers are characterized by the fact that the trailer frame or a part thereof is adapted to move longitudinally or pivot with respect to the trailer so that it is often unnecessary to submerge substantial portions of the trailer or the rear wheels of the vehicle in the water while the boat is launched or reloaded on the trailer. Exemplary of such telescoping and/or pivoting trailers are those disclosed in U.S. Pat. Nos. 2,713,951, 2,856,087, 3,032,353, 3,102,737, 3,138,271, 3,083,986, 3,140,003, 3,142,494, 3,326,573, 3,390,796, 3,822,899, 3,989,266 and 4,050,595. These movable trailer frames have generally met with little, if any, success. It is believed that the complexity of design, low reliability and high cost have prevented such trailers from gaining acceptance.

SUMMARY OF THE INVENTION

I have developed a telescoping trailer which is not complex, yet highly reliable and efficient. By minimizing the number of moving parts, the trailer can be sold competitively in the existing market.

I have invented a unique means for telescoping the main frame of a trailer suitable for transporting a boat or the like which comprises forming the tongue member of the trailer which extends longitudinally of the main frame in a continuous section, preferably having an I-shaped cross section. At least one sleeve member having a substantially rectangular cross section is provided on the main frame for slidably receiving the tongue member. Means, preferably opposed channels, are located within and are secured to the sleeve member for stabilizing the frame with respect to the tongue member. Which means are utilized for moving the tongue member with respect to the channel means.

In a preferred embodiment, the winch means include a gear change mechanism whereby the same crank can be used to move the main frame means with respect to the tongue member and the boat with respect to the frame.

BRIEF DESCRIPTION OF THE DRAWINGS

FIG. 3 is a front elevational view of a winch means used in the invention;

FIG. 4 is a side elevational view of the winch means shown in FIG. 3;

FIG. 5 is a broken away view showing the adjustable pulley at the end of the trailer;

FIG. 6 is a sectional view taken along lines VI—VI of FIG. 2;

FIG. 7 is a sectional view taken along lines VII—VII of FIG. 2;

FIG. 8 is a fragmentary side elevational view of an end of the tongue member;

FIG. 9 is a fragmentary perspective view of the end of the tongue member shown in FIG. 7;

FIG. 10 is a partial front elevational view of a modified cross rail;

FIG. 13 is a cross-sectional view taken along lines XIII—XIII of FIG. 12.

DETAILED DESCRIPTION OF THE PREFERRED EMBODIMENTS

Figure 1:
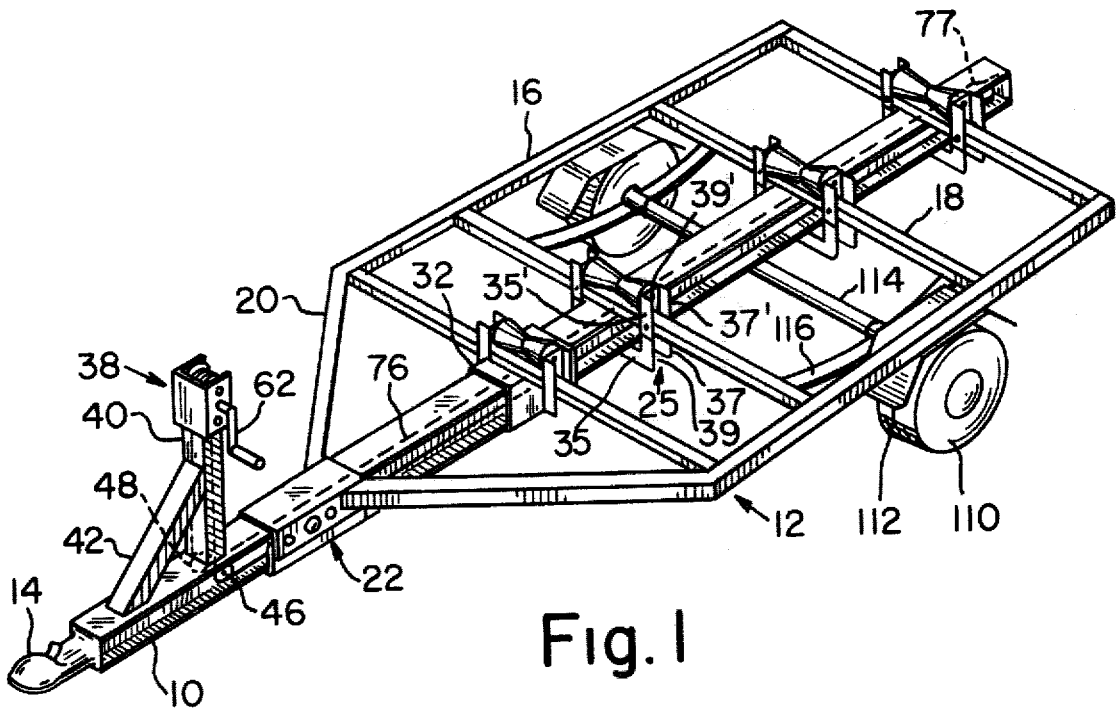
FIG. 1 is a perspective view of a trailer according to the invention.
Figure 2:
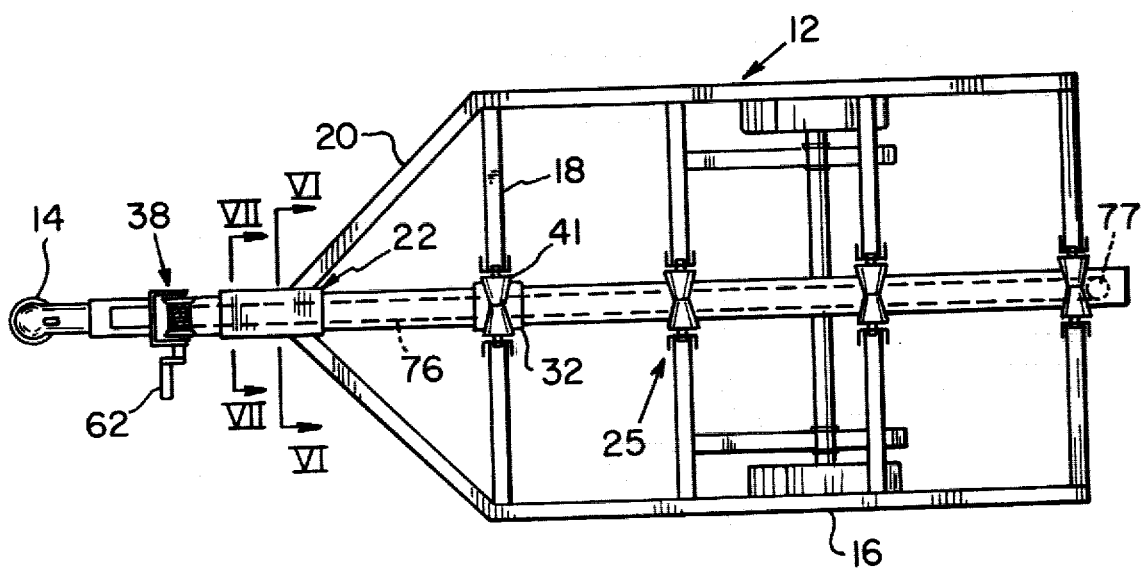
FIG. 2 is a plan view of the trailer shown in FIG. 1.

Referring to FIGS. 1 and 2, the telescoping trailer comprises a tongue member 10 which extends longitudinally of the main frame 12 of the trailer. The tongue member includes a hitch 14 suitable for connection to a ball (not shown) mounted on a motor vehicle for pulling the trailer. The main frame 12 comprises side rails 16 and cross rails 18 for joining the side rails. At the forward end of the trailer main frame 12, there are two spar rails 20 which extend forwardly of the trailer main frame 12 and permit an appropriate turning radius for the motor vehicle and trailer. The tongue member 10 is in the form of an I-shaped cross section, preferably an I-beam, and extends longitudinally of the main frame 12.

The forward end of the main frame 12 terminates in a sleeve 22 which slidably accommodates the I-beam 10. The spar rails 20 which are channel shaped are angled at their intersection with the I-beam 10 so as to extend parallel within I-beam 10 within the I-beam flanges 24 on either side of the web 26, FIG. 6. The sleeve 22 is made up of reversely directed channel members 28 and 30. The channel members 28 and 30 are connected to each other to form the sleeve 24 and to the spar rails 20 by a pair of rivets 36 located on each side of sleeve 22, FIGS. 1 and 6. It can thus be seen that the main frame 12 and sleeve 22 are free to slide along the I-beam 10. The main frame 12 is stabilized by the sleeve 22 and the axial extent of the spar rails 20 positioned within the flanges 24 of the I-beam 10.

A second sleeve 32 similarly constructed of two overlapping channel members as sleeve 22 is attached to the forwardmost cross member 18 and in slidable accommodation of I-beam 10, FIGS. 1 and 2. The second sleeve 32 gives added stability to the trailer. Since the second sleeve 32 supplements the stability of main sleeve 22, it can be shorter in axial extent. It will be recognized that a single sleeve may be adequate for small trailers and more than two sleeves may be similarly employed for exceptionally large trailers.

The remainder of the cross members 18 each have a fabricated channel 25 attached to it and which accommodates the I-beam 10, FIG. 1. Specifically, channel 25 is formed in two sections, namely, lower section 31 and upper section 33, FIG. 10. Each section is bent formed from sheet metal to include a pair of outwardly extending flanges 35 and 37, respectively, for the lower section 31 and 35' and 37' for the upper section 33, FIG. 1. The two pairs of flanges are joined by a web 39 and 39', respectively.

Upper section 33 also includes a roller 41 rotatably connected to the web 37' located on either side of roller 41 and between flanges 35' and 37'. Roller 41 accommodates the bottom of the hull of the boat (not shown). The lower section 31 is channel shaped to accommodate the I-beam 10, FIG. 10. Lower section 31 and upper section 33 include elongated slots 43' and 43, respectively, extending through the respective flanges. The slots 43' and 43 are aligned with each other and connecting bolt, nut and lockwasher (collectively 45) connects the two sections 31 and 33 to retain the I-beam 10. The elongated slots permit vertical adjustment of the roller 41 and the lower section 31. The connection 45 extends through the cross member 18 to give the necessary support for the I-beam 10, FIG. 10.

At the forward end of the tongue member 10 there is an upstanding winch 38 comprising a vertical support 40 which is welded to the top of the tongue member 10 and has a strengthening member 42 for supporting the support 40. On either side of web 26 of the I-beam, pulleys 46, 48 are rotatably mounted and vertically disposed with respect to the winch 38.

In FIGS. 3 and 4, I have shown a preferred form of winch for use with the trailer. The winch 38 comprises a first drum 50 which is rotatably mounted on an axle 52 which extends through the sidewalls 54 of the winch. On one end of the drum 50 there is a driving gear 56 for engagement with a gear 58 which is secured to axle 60 to which a hand crank 62 is attached. The axle 60 is loaded by spring 64, thus normally holding the gear 58 in the position shown in FIG. 3. The spring is retained by washer 66 and cotter key 68 which extends through an aperture in the end of axle 60. In the position shown in FIG. 3, gear 58 is engaged with a gear 70 secured to an axle 72 which journals drum 74 and also extends through the sidewalls 54.

A cable 76 (shown in FIGS. 1 and 2) is permanently affixed to sleeve member 22, extends around pulley 46, upwardly around drum 74 and then, after at least one or more turns on the drum 74, downwardly around pulley 48 and then along one side of the web 26 of I-beam 10, around pulley 77 at the rear end of the trailer and then back along the other side of web 26 of I-beam 10 (see FIG. 6) within the channels 25 and sleeve 32 for attachment to sleeve member 22. With this arrangement, by turning crank 62 it is possible to move the main frame 12 with respect to the tongue member 10 in either direction, depending upon the direction of rotation of the crank. It will be recognized that an electric motor can be employed to operate the winch and this would be desirable, particularly for large boats and trailers.

It is also normally desired to move the boat with respect to the main frame, and an additional cable means such as cable 78 is connected to drum 50, the axle 60 is moved outwardly against the spring 64 so that gear 58 engages with gear 56, thereby enabling the cable 78 to be connected to the bow of a boat (not shown) on the trailer and the boat moved with respect to the main frame 12. To permit movement of the axle 60, it is necessary to move a locking key 80 which, as shown in FIG. 4, comprises a slot 82 which is adapted to engage one of slots 84 or 86 (FIG. 3) in axle 60 and hold the axle with respect to the drums 50 and 74. Of course, if the winch is electric, the boat as well as the trailer will be moved by the electric motor.

A particular feature of the invention is the arrangement of the pulley 77 at the rear of the tongue member 10, as shown in FIG. 5. A slot 79 in the web 26 of I-beam 10 accommodates the entire pulley arrangement. As shown, pulley 77 lies in a horizontal plane with respect to the main frame 12 of the trailer. The pulley is journaled on an axle 88 which is mounted in a U-shaped member 90 secured to a threaded member 92. The threaded member extends through an opening in a vertical plate 94 connected at the end of I-beam 10 and includes a nut 96. The whole arrangement is biased by a spring 98 which is compressed between the wall 94 and the nut 96, thus continuously holding the cable 76 in tension. It is also possible for the cable to extend along the top of the I-beam in which case it is not necessary to employ a slot in the web to accommodate the pulley. This gives the added advantage of connecting to the forward sleeve 22 along its center line to avoid any off center application of forces. In this latter case, the pulleys will be mounted atop the I-beam and not on either side of the web.

A further feature of the invention, as shown in FIG. 7, is the mechanism to lock the trailer body to the I-beam during transportation. Aligned apertures 100 are positioned in opposite sides of sleeve 22, spar rails 20 and in the web 26 of the I-beam. A lockpin 102 is adapted to be inserted through these aligned apertures to maintain the sleeve 22 in the position shown in FIG. 1 with respect to the tongue member 10 for highway traveling. It will be noted that the lockpin 102 is, in its locked position, biased by coil spring 104 which extends between the head of lockpin 102 and the outside wall of sleeve 22. On the opposite end of the lockpin shank there is a slot within which a locking device 106 is journaled on a pin 108 which extends through the shank of lockpin 102. By rotating the device 106 to a position 90° from the position shown in FIG. 7, it is evident that the lockpin can be withdrawn in the direction of the lockpin head to permit longitudinal movement of the main frame 12 with respect to the tongue member 10.

In FIGS. 8 and 9, I have shown the structure of the rearwardmost end of the tongue member, i.e. I-beam 10, which is tapered. In this respect, it will be noted that the web 26 includes a slight upward taper from the lower portion of the I-beam and the lower portion of the I-beam is removed to permit channels 22 to be longitudinally moved to and off the rearward end of the tongue member to be easily relocated so that it can be moved forward on the tongue member by the winch 38. The primary sleeve and the second sleeve 32 remain on the I-beam 10 even in the fully extended position and it is the remaining channels 25 which are re-entered by the I-beam 10. For example, I-beam 10 may be in excess of 20 feet but sleeve member 22 need only be a couple of feet long with second sleeve 32 being shorter to provide the necessary stability and telescoping.

The main frame 12 also includes suitable running wheels 110, fenders 112, the running wheels being mounted on an axle 114 which is appropriately secured by leaf springs 116 to the main frame. For purposes of transporting a boat, appropriate pads, additional rollers and/or mounts, including shock absorbing devices such as rubber or neoprene, may be secured to the main frame. These types of boat mounting means are conventional as are shown in the prior art cited at the beginning of this specification and, therefore, need not be discussed in detail.

Figure 11:
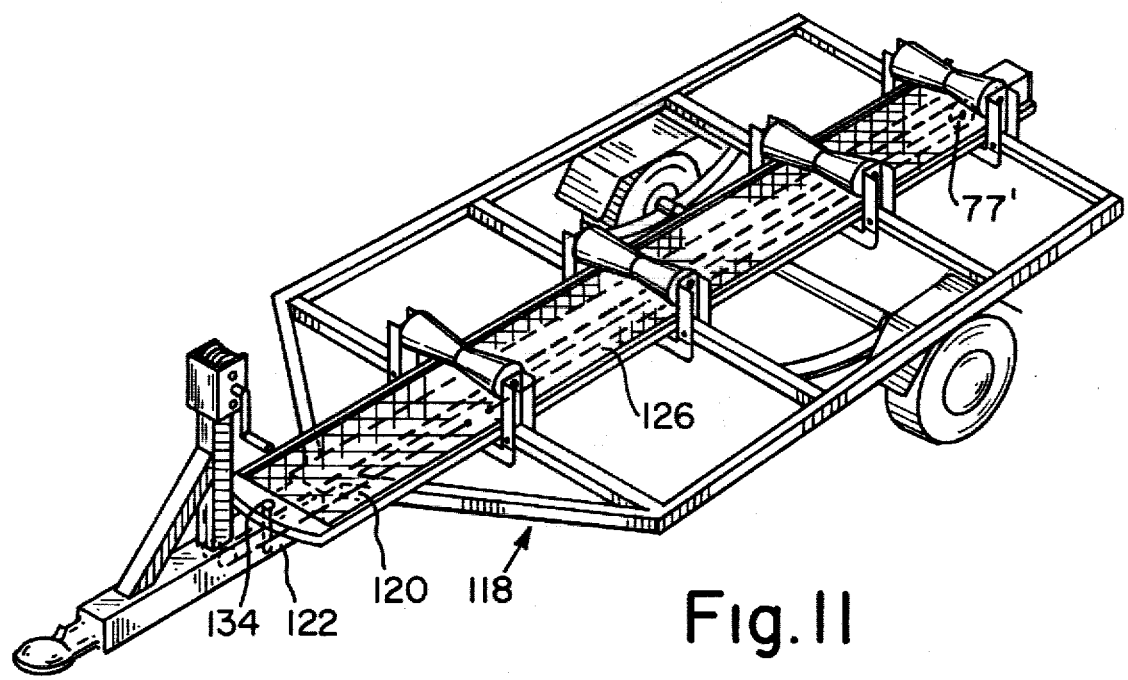
FIG. 11 is a perspective view of a modified trailer according to the invention.
Figure 12:
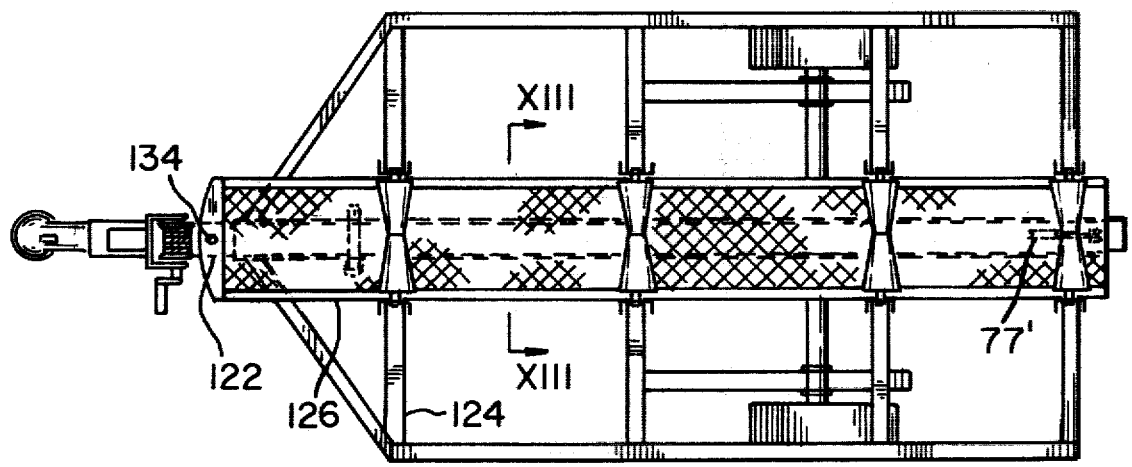
FIG. 12 is a top plan view of the trailer shown in FIG. 10.

In another embodiment of the invention shown in FIGS. 11, 12 and 13, the main frame 118 of a boat trailer includes a continuous longitudinally extending sleeve member 120 having a substantially rectangular cross section (e.g. square tubing) which is adapted to envelope a telescoping tongue member 122. The tongue member 122 is in the form of a channel and has a substantially inverted U-shaped cross section, see FIG. 13. The operation of the telescoping mechanism of this embodiment is identical to that described with respect to the first and preferred embodiment. The rear pulley 77' is attached in the end of the tongue member 122 and the cable 76' is protected by being within sleeve 120 and tongue 122, FIG. 13. Cable 76' attaches at both ends to the moveable sleeve member 120.

To provide means for reaching a boat carried by the trailer, I propose to use a telescoping walkway. The walkway is suitable for both modifications of my trailer; therefore, I have chosen to describe it with respect to the second embodiment although it is also shown in FIG. 10 of the first embodiment to show how it is adapted for both. As shown in FIGS. 11-13, the longitudinal sleeve member 120 surrounds the tongue member 122 of the trailer. The sleeve member 120 is mounted on a series of cross frame members 124 similar to the members which comprise the main frame of the trailer shown in FIG. 1 of the drawings. A longitudinal walkway 126 extends transverse of the members 124 and along the extended sleeve member 120. Suitable framing supports 128 are mounted on opposite sides of the trailer to the cross frame members 124 to accommodate the walkway 132, FIG. 13. The supports include longitudinal slots 130 which open inwardly of the main frame of the trailer. The walkway 132 is connected to the tongue member by means of a fastener, such as bolt 134. When the trailer is telescoped rearwardly on the tongue member, the walkway 132 remains stationary as the frame slides in the supports 128. The walkway 132 may be used to reach a boat on the trailer.

Having described presently preferred embodiments of the invention, it is to be understood that it may otherwise be embodied within the scope of the appended claims.

I claim:

1. In a trailer suitable for transporting a boat or the like and having a tongue member extending longitudinally of the main frame for drafting the trailer, the improvement comprising means for telescoping the main frame of the trailer with respect to the tongue member, said means comprising:
   A. at least one sleeve member having a substantially rectangular cross section extending longitudinally of said frame and adapted to slidably receive said tongue member;
   B. winch means secured to said tongue member and comprising:
      i. an upstanding vertical support;
      ii. a pair of drums journaled in said support, each of said drums having a gear for rotating said drum;
      iii. turning means journaled in said support and including a driving gear for alternate engagement with a gear of a drum; and
      iv. a cable associated with each of said drums, a first cable being attached to the sleeve member of the main frame at a first position and a second cable being adapted to be connected to the bow of a boat or the like;
   C. first pulley means vertically disposed with respect to the winch means;
   D. a second pulley means positioned at an end of the tongue member remote from the support said first cable extending about said first and second pulley means and said drum and attached to said sleeve member at a second position; and
   E. a pulley support secured to a rear end of the tongue member and accommodated within an opening in the tongue member for rotatably retaining the second pulley means, said pulley support being biased in a direction away from the vertical support of the winch means such that the first cable is maintained under tension whereby when the turning means is engaged with one drum and rotated, the main frame of the trailer telescopes with respect to the tongue member and when the turning means is engaged with the other drum, a boat or the like may be moved with respect to the trailer.

2. The improvement as set forth in claim 1 wherein said tongue member has an I-shaped cross section and means are provided within and secured to said sleeve member for stabilizing the frame with respect to the tongue member.

3. The improvement as set forth in claim 2 wherein the stabilizing means comprises a pair of opposed members forming a forward part of said frame, the members being secured to a wall of the sleeve member and extending within the area formed by the I-shaped cross section of the tongue member.

4. The improvement as set forth in claim 1, said trailer including a walkway extending longitudinally of the trailer, coaxially along the tongue member and connected to the tongue member, said frame also being slidable with respect to said walkway.

5. The improvement as set forth in claim 1 wherein said sleeve member extends substantially the length of the trailer.

6. A boat trailer comprising:
A. a tongue member extending the length of the trailer, said tongue member being in the form of an I-beam having flanges and a web;
B. a frame formed of side rails, cross rails and a pair of forwardly angularly disposed spar rails;
C. a sleeve member having a substantially rectangular cross section, said sleeve member connected to said frame and adapted to slidably receive said tongue member; and
D. winch means secured to said tongue member, said winch means including a winch connected to a forwardly positioned upstanding member, a pair of pulleys adjacent the upstanding member on either side of the web of the I-beam, a single adjustable tensioning pulley located adjacent a rear end of the tongue and accommodated within a slot in the web of the I-beam and a cable formed endless, said cable connected to said sleeve and extending around one of said pair of pulleys, about said winch, around the other of said pair of pulleys, along said tongue member in a rearward direction, about said adjustable tensioning pulley and along said tongue member in a forward direction to said sleeve.

7. The boat trailer of claim 6, each of said spar rails including a forward end section extending longitudinally of said I-beam within said flanges and connected to the sleeve member to stabilize the frame with respect to the tongue member.

* * * * *